United States Patent [19]

Simmons et al.

[11] 4,406,005
[45] * Sep. 20, 1983

[54] DUAL RAIL TIME CONTROL UNIT FOR A T-S-T-DIGITAL SWITCHING SYSTEM

[75] Inventors: Nathaniel Simmons; Stig Magnusson, both of Phoenix; Sergio E. Puccini, Scottsdale, all of Ariz.; Donald W. McLaughlin, Naperville; David J. Stelt, Lombard, both of Ill.

[73] Assignee: GTE Automatic Electric Labs Inc., Northlake, Ill.

[*] Notice: The portion of the term of this patent subsequent to Jul. 5, 2000, has been disclaimed.

[21] Appl. No.: 219,547

[22] Filed: Dec. 23, 1980

[51] Int. Cl.³ .................................................. H04J 3/00
[52] U.S. Cl. .................................. 370/63; 179/1 SW; 179/18 J; 370/58
[58] Field of Search .................... 370/63, 58; 179/18 J, 179/18 G, 18 ES, 1 SW

[56] References Cited

U.S. PATENT DOCUMENTS

| | | | |
|---|---|---|---|
| 3,956,593 | 5/1976 | Collins et al. | 370/63 |
| 3,991,276 | 11/1976 | Regnier et al. | 370/63 |
| 4,005,272 | 1/1977 | Collins et al. | 370/63 |
| 4,064,370 | 12/1977 | Coonce et al. | 370/58 |
| 4,142,068 | 2/1979 | Charronsel et al. | 370/63 |
| 4,160,127 | 7/1979 | Slana et al. | 370/63 |
| 4,322,843 | 3/1982 | Beuscher et al. | 370/63 |

Primary Examiner—Glen R. Swann, III
Attorney, Agent, or Firm—Frank J. Bogacz; Robert J. Black

[57] ABSTRACT

A simplex time-space-time switching network is shown in which there is a crossover of voice information from one rail to another rail in a large digital switching system. The time control unit is divided into two rails both incoming and outgoing. Each rail multiplexes two 193 channel streams into one 386 channel stream of information. These two rails crossover in the originating time switching stage but remain segregated throughout the space switching stage and the terminating time switching stage.

7 Claims, 4 Drawing Figures

DUAL RAIL TIME CONTROL UNIT FOR A T-S-T-DIGITAL SWITCHING SYSTEM

CROSS-REFERENCE TO RELATED APPLICATIONS

The present application is related to co-pending U.S. Patent application Ser. Nos. 219,550; 219,548; 219,549; 219,464 and 219,546, all assigned to the same assignee.

The present invention pertains to digital switching systems and more particularly to a large capacity time switching stage of a digital switching system.

The technology of telephone switching centers has proceeded from mechanical to electromechanical to solid state technologies. The network portion of the switching centers has kept the pace with this change of technologies. The network of large switching systems has gone from a mechanical network to an analog electromechanical network to the present modern day solid state digital networks.

In addition, an increasing number of customers has provided for an increased amount of central switching system capability. Digital switching techniques were initially introduced via PABX switching equipment. Following this introduction, digital techniques were employed in larger PABX's and finally in central office switch equipment.

As the demand for digital switching equipment grows, large central office switching systems are required. Further, it is required that these switching systems operate efficiently in terms of power consumed and heat dissipated and with a minimum of components. As these switching systems grow, larger channel capacities are required.

One scheme of increasing the network capacity of a digital switching system is to increase the size of the time and space switching sections of a time-space switching network. However, doubling the number of time slots in the time stage increases the size of the space stage by a factor of two squared or 4 times. Such a configuration means greatly increasing the number of physical components of space switching equipment.

Such a solution is taught by U.S. Pat. No. 3,991,276, issued on Nov. 9, 1976, to A. Regnier et al. This system teaches a time-space-time division switching network employing a multistage space division switch. Another time-space-time switching network is taught in U.S. Pat. No. 4,005,272, issued on Jan. 25, 1977, to A. A. Collins et al. When this system establishes a communication path in one direction, it automatically establishes a path in the opposite direction in an adjacent time slot. However, such folded network systems provide a higher percentage of blocking which greatly lessens the call handling capacity of the system.

Another folded network time division switching system is taught by U.S. Pat. No. 4,064,370, issued on Dec. 20, 1977, to H. E. Coonce et al. The space division portion of the switching network is physically large resulting in delays of digital data words transmitted through the system. In addition, the problems of a folded network as mentioned in the Collins reference above are present in the Coonce system also.

In addition, a non-folded T-S-T modular network is taught by U.S. Pat. No. 3,956,593, issued to A. A. Collins et al, on May 11, 1976.

Accordingly, it is an object of the present invention to provide a large time-space-time network for a digital switching system which is low in the percentage of blocking and providing for an efficient space switching while handling a large number of channels.

It is a further object of the present invention to provide for a low cost of telephone service provided to each customer.

It is a further object of the present invention to provide a time switching network for a large digital switching system having the capability to increase modularly and provide new telephone switching services to the telephone customers.

SUMMARY OF THE INVENTION

The present invention comprises a time stage in a non-folded time-space-time digital switching system. Telephone subscribers are connected to analog facility interface units. An analog facility interface unit produces pulse code modulated (PCM) samples for transmission to the time-space-time network. The time stages of the network are termed time and control units. The number of time and control units in the system is modularly expandable from 1 to 64. Each time and control unit has an originating time stage and a terminating time stage. These time stages are connected between a respective analog facility interface unit and the space switching stage.

Each of the time stages are further connected via a microprocessor interface to a peripheral processor. The peripheral processor comprises a microprocessor CPU. The peripheral processor controls the switching of the calls through the time switching network. Each time stage consists of an information memory is interconnected to a control memory. The peripheral processor associated with the particular time and control unit is connected to the control memory of both the originating and terminating time stages. Each information memory is connected to the space switching stage. The control memory contains information for determining the switching of the call. The information memory contains a PCM sample representing the amplitude of the voice signal of the telephone call.

The information memory of each originating time stage contains 4 information memory units. Two rails, each rail consisting of 2 PCM channel streams from two facility interface units, are connected to each originating time stage. The two PCM streams comprising each rail are multiplexed into a memory unit corresponding to the particular rail. In addition, each PCM stream is multiplexed into a memory unit corresponding to the opposite rail. That is, rail A information is written into rail A's memory and into a memory of rail B and rail B information is written into rail B memory and into a memory associated with rail A.

PCM voice samples may be switched through the network either on rail A or B. Rail A and rail B each have separate switching paths through the remainder of the network. That is, these paths are segregated through the space stage and the terminating time stage.

As a result, telephone call originating on rail A, which would otherwise be blocked on the rail A path, are able to be switched through the network on rail B path, and vice versa.

DESCRIPTION OF THE PREFERRED EMBODIMENT

Figure 1:
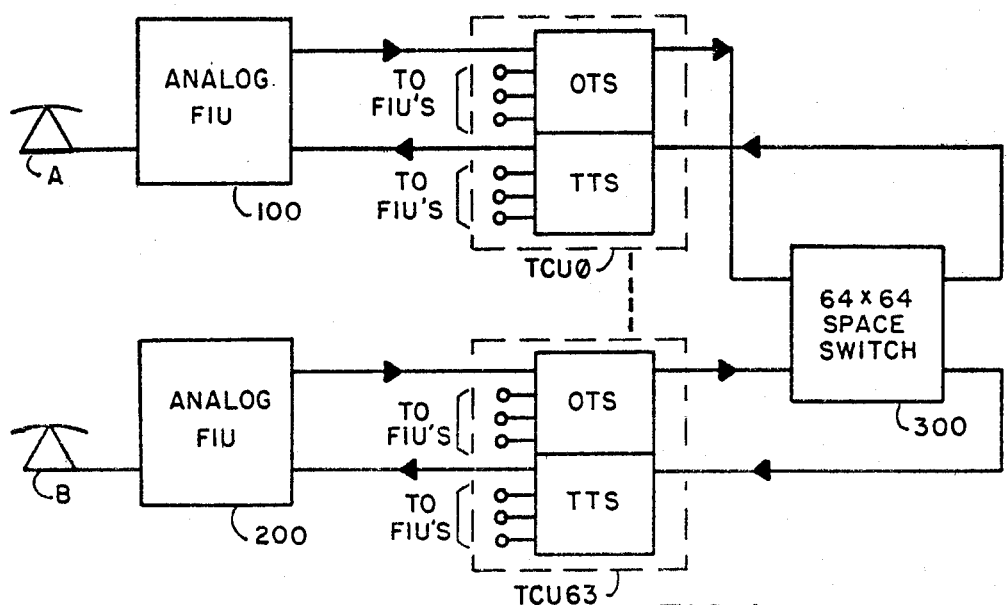
FIG. 1 is a block diagram depicting the network structure of the present invention.

FIG. 1 is a block diagram showing the network connections of a digital switching center for switching a local to local telephone call. Subscriber A is connected via an analog facility interface unit (FIU) 100. The analog FIU 100 has a PCM voice connection to time and control unit (TCU) 0. The digital switching network may contain from 1 to 64 TCU's. Each TCU has 2 time stages associated with it, an originating time stage (OTS) and a terminating time stage (TTS).

Next, a connection is made from the OTS of the particular TCU to the 64 by 64 space switch 300. Then, a connection is established between the space switch 300 and the terminating time stage of a TCU 63, for example. The telephone subscriber B is then connected through analog FIU 200 to the TTS of TCU 63.

Next a voice transmission link is established from subscriber B to subscriber A. This communication link is established via analog FIU 200, through the originating time stage OTS of TCU 63, through space switch 300, through the terminating time stage TTS of TCU 0, through analog FIU 100 to subscriber A. At this time, a full talking path has been established from subscriber A to subscriber B.

Each of the analog FIU's convert the incoming analog voice signals to PCM signals for transmission through the network. The sampling rate of the FIU's is 8,000 samples per second or 1 every 125 microseconds. Each analog FIU has a capacity of 193 channels. Each time frame is 125 microseconds in duration and there are 193 time slots per time frame. One time slot is 648 nanoseconds (ns.) in duration.

Figure 2:
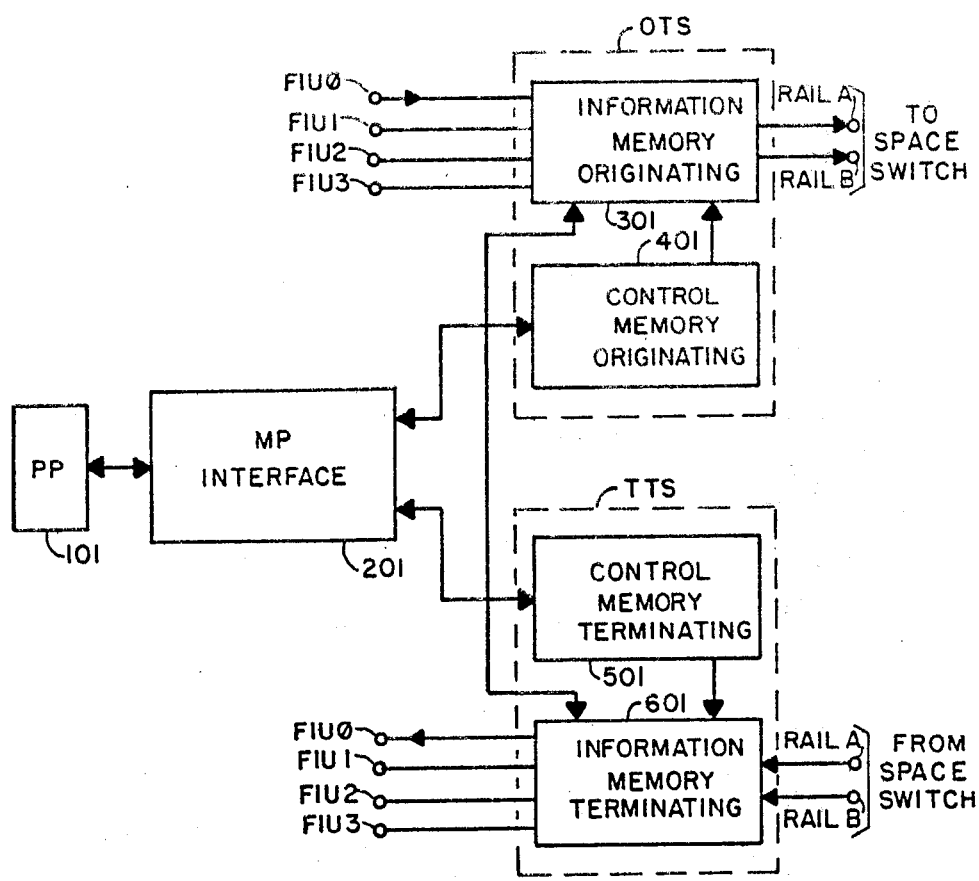
FIG. 2 is a block diagram showing the originating and terminating time switching stages of the network of the present invention.

FIG. 2 shows the connections of a particular TCU to a corresponding microprocessor CPU controller. The CPU is a distributed peripheral processor (PP) 101. This processor may comprise an intel 8086 microprocessor or other similar unit. Each stage of a time and control unit includes an information memory and a control memory. For example, the originating time stage OTS shown includes information memory 301 and control memory 401. Microprocessor interface 201 connects peripheral processor 101 to each of the control memories 401 and 501. These connections include an address and data bus and suitable controls for reading and writing the memory, along with clock signals. The information memories 301 and 601 each contain information memory units with PCM samples. Each TCU is connected to 4 FIU's. Each FIU provides for 193 channels of information to be transmitted through the information memory. Two groups of 193 channels comprise an information rail. Each information memory is therefore capable of handling 2 such rails. That is, each rail contains 386 channels of information.

Each information memory is further connected to the space switch (not shown in this figure). Each information memory contains PCM samples representing the amplitude of the voice signal. Twelve bits are required. Eight bits represent the amplitude of the voice signal, three bits of supervisory signals and one parity bit.

Since each information memory contains 2 rails of incoming information and there is multiplexing within each rail, at least 2 physical memory units of 386 words are required.

Each control memory originating 401 and control memory terminating 501 contains data which is provided by the peripheral processor 101 and defines the input/output time slot relationship of its associated information memory originating 301 and terminating 601 respectively. Each channel originating from an FIU is assigned predetermined time slot address in the information memory originating 301 and the control memory originating 401. Time slots in each of the information memories 301 and 601 are automatically assigned, whereas time slots in control memories 401 and 501 are assigned by the stored program of the peripheral processor 101.

Each time slot is allotted a basic time interval of 324 nanoseconds. This time slot interval is divided into two 162 nanosecond phases.

During the first phase, the control memory is read at the particular time slot counter address. During the same phase, the PCM data of the particular channel in that time slot is written into the information memory at the appropriate time slot.

During the second phase, the control memory is written into or read from by the peripheral processor 101 in order to control the operation of the time switch. During the same phase, the information memory is read at the address contained in the control memory data register corresponding to the particular time slot in question.

Figure 3:
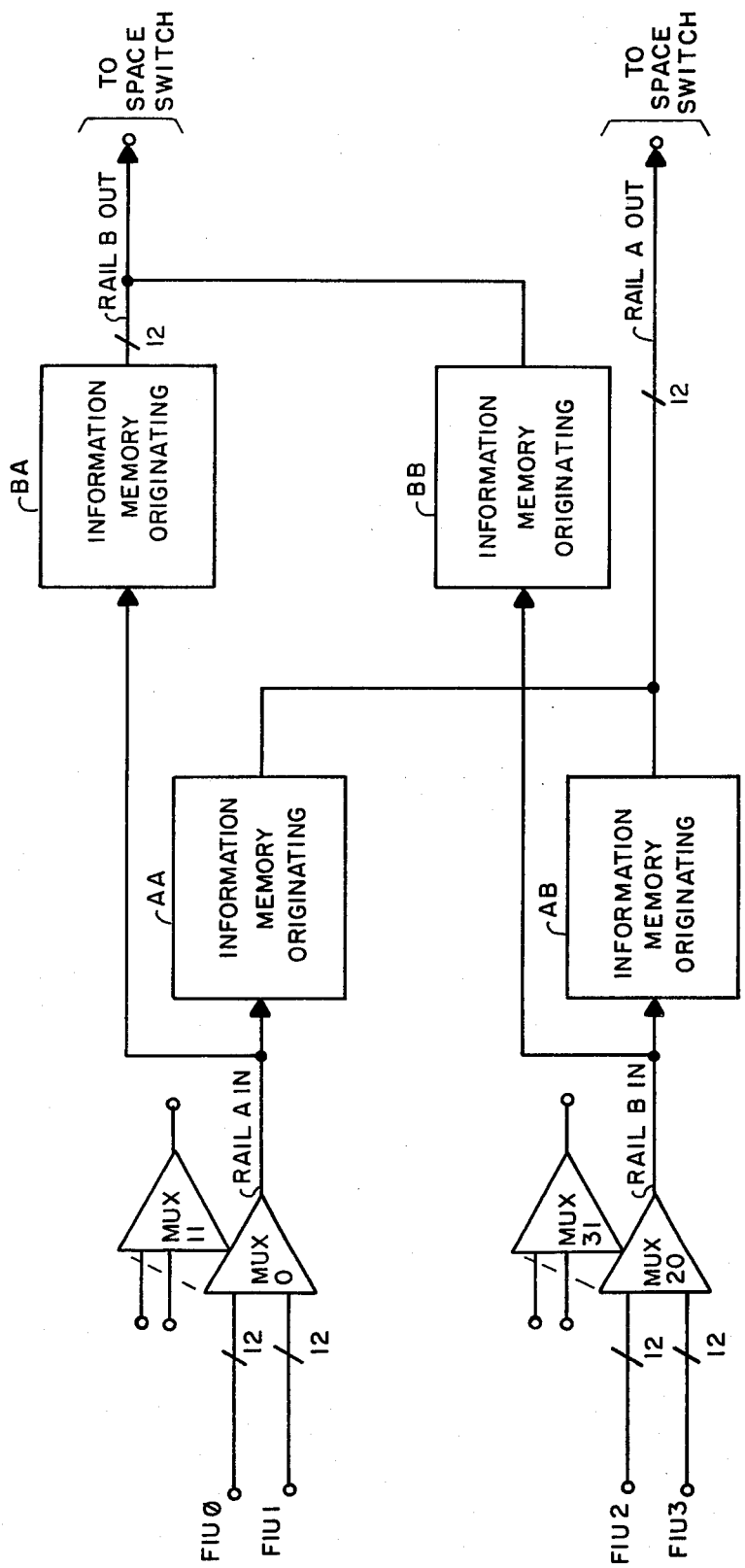
FIG. 3 is a schematic diagram showing the dual rail crossover of the originating information memory.

Referring now to FIG. 3, a schematic diagram of the information memory originating as indicated by block 301 in FIG. 2 is shown. The information memory originating comprises four information memory units AA, AB, BA and BB. A bus connects each FIU 0-3 to a memory through a multiplexer. The collection of 193 channels from FIU 0 and FIU 1 comprise rail A. A similar configuration, rail B, is obtained from FIU's 2 and 3.

The information memory unit is identification consists of 2 letters. The first letter indicates the logical group of the memory and the second letter indicates the incoming rail from which the memory is written. Rail A is connected to information memory units AA and BA. Similarly rail B is connected to information memory units AB and BB. Multiplexers 0-11 allow for the sharing of rail A by facility interface units 0 and 1 and mulitplexers 20-31 similarly allow for the sharing of rail B by facility interface units 2 and 3.

The rail out bus connects information memories AA and AB to the A portion of the space switch. Similarly, the rail B out bus connects information memories BA and BB to the B portion space switch. The voice samples transmitted on rail A are written into voice memories AA and BA and similarly the voice samples of rail B are written into information memories AB and BB. As a result, one memory unit in each logical group contains the voice information for each channel. Therefore, this information may be transmitted through the space switch from either of the memories which contain this information, but only from one. Therefore, information entering the originating time switch on rail A may exit the originating time and control unit on rail B and vice versa. This information will be transmitted through the corresponding space stage to the exit rail, since the space switches are segregated. Similarly, information originating on rail B may be transmitted out via the rail A out bus to the A space switch.

This crossover of information from rail A to rail B and vice versa allows the size of the space switch to be minimal. Crossover in the space switch would require four times the cross points as the present space switch. As a result, this crossover configuration in the originating time stage provides for allocation of network paths equally through rail A and B and in addition, it prevents blocking conditions in the network.

Figure 4:
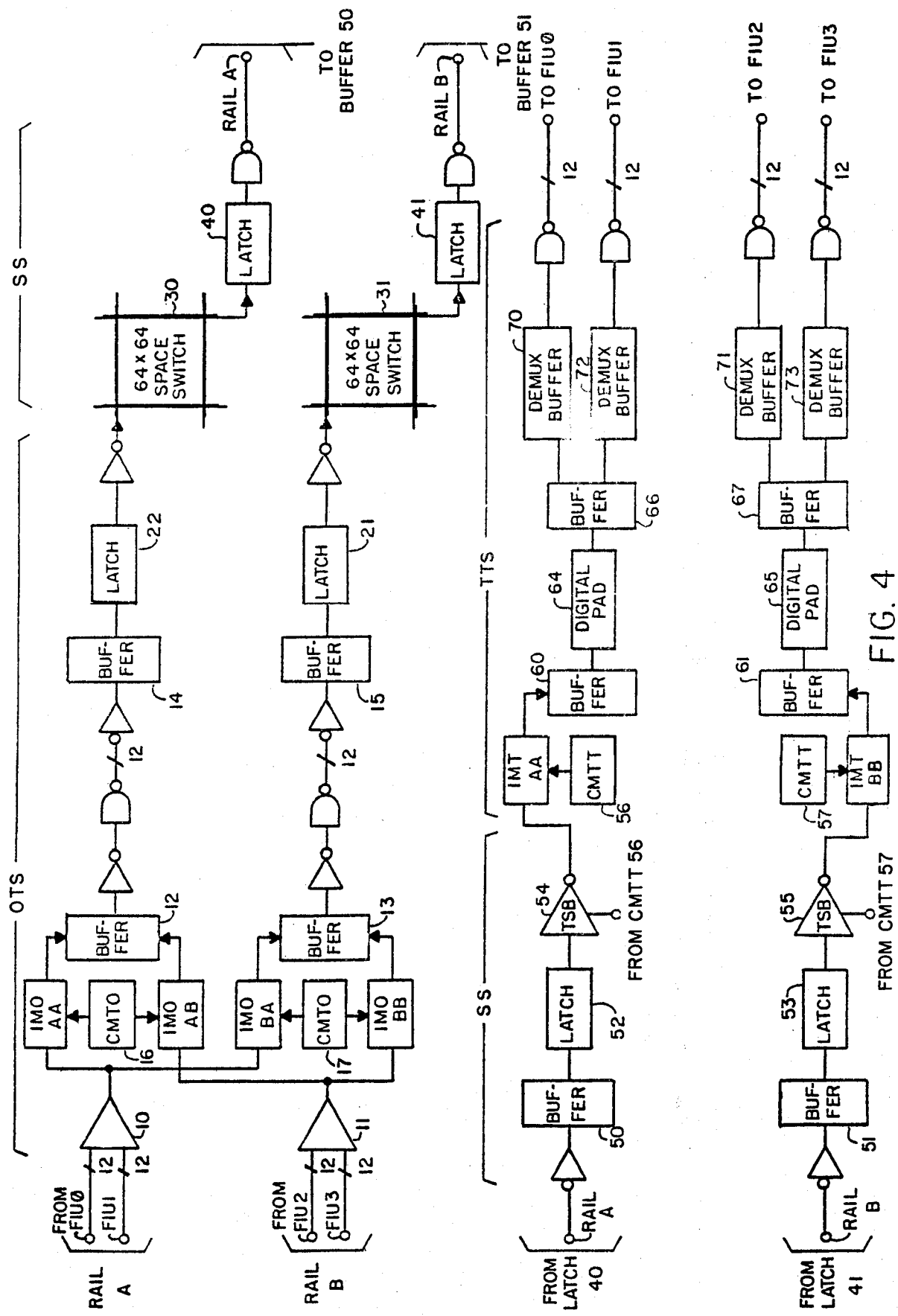
FIG. 4 is a schematic diagram of the time-space-time switching network.

Referring now to FIG. 4, a complete time-space-time network is shown in schematic form. The network is connected between facility interface units. These FIU's connect lines, trunks or other transmission media to the network for switching. Rail A, comprising PCM channel streams from FIU 0 and 1, is connected to 12 bit wide multiplex 10 into information memory IMO AA and BA; and, similarly rail B is connected through 12 bit wide multiplex 11 to information memories BB and AB. The PCM voice samples are written into both memories simultaneously at a particular time slot. Under control of a master processor (not shown), a connection through the space switch is established and the PCM voice samples gated out of the appropriate originating time slot memory and transmitted to the terminating time stage. For example, if the master processor determines that rail A PCM information is able to be switched, IMO AA is read during the proper time slot and the 12 bit data word is transmitted through buffer 12 with appropriate drive and received by buffer 14 where the data is then latched in latch 22. When the space switching connection becomes stable data is transmitted through this connection to latch 40 where it is again provided with additional drive.

If no switching connection could be established through space switch 30, control information memory BA will transmit the data stored in this same time slot through buffers 13 and 15 to latch 21 where it would be switched through space switch 31 and held at latch 41, similar to the operation described above for rail A.

Again following the example of rail A, the 12 bit PCM sample is transferred from latch 40, through buffer 50 and is again latched to latch 52. At a time which is 8 times slots greater than the slot in which the PCM sample was stored in the originating time section, control memory terminating 56 operates tri-state buffer 54 to transmit the PCM data into the information memory terminating AA. Then, at the appropriate time slot in the terminating time section, this information is read from information memory terminating IMT AA through buffer 60 to the digital pad 64. The digital pad 64 will selectively attenuate the amplitude of the PCM signal. The data is then transmitted to buffer 66.

At the appropriate time division, either demultiplexing buffer 70 or 72 is operated depending upon which facility interface unit is to receive the voice sample. If facility interface 0 is to receive the sample demultiplex buffer 70 is operated and for FIU 1 demultiplexing buffer 72 is operated.

A similar operation would occur on rail B for a PCM signal switched through space switch 31, latch 41, buffer 51 into latch 53. At appropriate time slot, under control of the CMTT 57, tri-state buffer 55 is enabled and a PCM sample is stored in information memory BB. Peripheral processor 10 also will establish proper switching information in control memory 57, which will enable the PCM sample to be switched to FIU 2 or 3 through buffer 61, digital pad 65 and buffer 67 and either demultiplexing buffer 71 or 73.

The buffers (12, 13, 60, 61, 66 and 67) and latches (22, 21, 40, 41, 52 and 53) of FIG. 4 may be implemented with integrated circuit part number 74S175 or equivalent device such as manufactured by Texas Instruments Corporation. Buffers 14, 15, 50 and 51 may be implemented with integrated circuit part no. 74LS670. Multiplexer banks 10 and 11 may be implemented via integrated circuit part no. 74S157 or similar device. Information memories may be implemented via integrated circuit part no. 94L422 manufactured by Fairchild Semiconductor Inc.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a time-space-time switching system including first and a second buses, each bus transmitting a plurality of PCM voice samples to a switching network, said buses being connected between said network and subscriber interface equipment, said switching network comprising:

first and second space switching means;

first and second terminating time switching means connected respectively to said first and second space switching means and connected to said subscriber interface equipment, each of said terminating time switching means being operated to switch said PCM voice samples to said subscriber interface equipment;

first and second originating time switching means, each of said originating time switching means being operated to switch said PCM voice samples from said subscriber interface equipment, connected respectively between said first and said second buses and said first and second space switching means and said subscriber interface equipment;

each of said originating time switching means including:

first and second memory means each connected to said first and second buses, said first and said second memory means being interconnected so that said first and said second memory means are written into simultaneously in sequential time slots with said PCM samples transmitted via said buses; and said first and said second memory means further being operated so that said PCM samples contained on said first bus may be switched through said second space switching means to said second terminating time switching means and said PCM samples contained on said second bus may be switched through said first space switching means to said first terminating time switching means.

2. A switching network as claimed in claim 1, wherein each of said first and second memory means includes:

a control memory containing switching information;

an information memory connected to said corresponding control memory for storing said PCM samples;

said information memory of said first memory means being connected to said second bus; and said information memory of said second memory means being connected to said first bus.

3. A switching network as claimed in claim 2, wherein:

each information memory includes at least first and second memory units;

said first memory unit of said first memory means is connected to said first memory unit of said second memory means and connected to said first bus;

said second memory unit of said first memory means is connected to said second memory unit of said second memory means and connected to said second bus;

said first and second memory units of said first memory means are connected to said first space switching means, said first memory unit is operated to transmit said PCM samples to said first space switching means or alternatively said second memory unit is operated to transmit said PCM samples to said first space switching means; and said first and second memory units of said second memory means are connected to said second space switching means, said first memory unit is operated to transmit said PCM samples to said second space switching means or alternatively said second memory unit is operated to transmit said PCM samples to said second space switching means.

4. A switching network as claimed in claim 1, wherein:

said first bus includes:

a plurality of first bus means; and multiplexing means connected between each of said first bus means and said first and second originating time switching means; and said second bus includes:

a plurality of second bus means; and multiplexing means connected between each of said second bus means and said first and second originating time switching means.

5. A switching network as claimed in claim 1, wherein there is further included:

first demultiplexing means connected between said first terminating time switching means and said subscriber interface equipment; and second demultiplexing means connected between said second terminated time switching means and said subscriber interface equipment; and each said demultiplexing means is operated to time share said connection between said terminating time switching means and said subscriber interface equipment.

6. A switching network as claimed in claim 1, wherein:

each of said terminating time switching means includes:

a control memory containing switching information;

an information memory connected to said control memory for storing said PCM samples; and said information memory is operated to switch said PCM samples to said subscriber interface equipment.

7. A switching network as claimed in claim 2 or 6, wherein there is included:

a central processing unit connected to each of said control memories for controlling time switching of said PCM voice samples.

* * * * *